United States Patent
Hu et al.

(10) Patent No.: US 7,916,426 B2
(45) Date of Patent: Mar. 29, 2011

(54) HEAD WITH AN AIR BEARING SURFACE HAVING LEFT AND RIGHT LEADING PRESSURIZING STEPS, EACH WITH SHORT AND LONG REGIONS

(75) Inventors: Yong Hu, Fremont, CA (US); Eric T. Sladek, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 788 days.

(21) Appl. No.: 11/948,789

(22) Filed: Nov. 30, 2007

(65) Prior Publication Data
US 2009/0141403 A1 Jun. 4, 2009

(51) Int. Cl.
*G11B 5/60* (2006.01)
(52) U.S. Cl. ............... 360/236.1; 360/236.3; 360/235.6
(58) Field of Classification Search ............. 360/235.4, 360/235.5, 235.6, 235.7, 236.1, 236.2, 236.8, 360/236.9
See application file for complete search history.

(56) References Cited

U.S. PATENT DOCUMENTS

| | | | |
|---|---|---|---|
| 5,343,343 A | 8/1994 | Chapin | |
| 5,353,180 A | 10/1994 | Murray | |
| 5,568,981 A | 10/1996 | Nepela et al. | |
| 5,583,722 A | 12/1996 | Dorius et al. | |
| 5,587,858 A | 12/1996 | Dorius et al. | |
| 5,870,250 A | 2/1999 | Bolasna et al. | |
| 5,917,679 A | 6/1999 | Park et al. | |
| 6,021,020 A | 2/2000 | Itoh et al. | |
| 6,055,127 A | 4/2000 | Boutaghou et al. | |
| 6,072,662 A | 6/2000 | Utsunomiya | |
| 6,212,032 B1 | 4/2001 | Park et al. | |
| 6,445,542 B1 | 9/2002 | Levi et al. | |
| 6,483,667 B1 | 11/2002 | Berg et al. | |
| 6,490,135 B1 | 12/2002 | Sannino et al. | |
| 6,498,701 B1 | 12/2002 | Berg | |
| 6,504,682 B1 | 1/2003 | Sannino et al. | |
| 6,515,831 B1 | 2/2003 | Sannino et al. | |
| 6,594,113 B2 | 7/2003 | Rao et al. | |
| 6,606,222 B1 | 8/2003 | Ryun | |
| 6,661,612 B1 | 12/2003 | Peng | |
| 6,678,119 B1 | 1/2004 | Pendray et al. | |
| 6,747,847 B2 | 6/2004 | Stoebe et al. | |
| 6,785,093 B2 | 8/2004 | Baba et al. | |
| 6,980,399 B2 | 12/2005 | Rajakumar et al. | |
| 6,989,967 B2* | 1/2006 | Pendray et al. | ............ 360/236.5 |
| 7,019,945 B1 | 3/2006 | Peng et al. | |
| 7,027,265 B2 | 4/2006 | Koishi | |
| 7,106,556 B2 | 9/2006 | Pendray et al. | |
| 7,583,473 B2* | 9/2009 | Bolasna et al. | ............ 360/236.2 |
| 7,616,405 B2* | 11/2009 | Hu et al. | ................... 360/236.2 |
| 7,719,795 B2* | 5/2010 | Hu et al. | ................... 360/235.7 |
| 2002/0001157 A1* | 1/2002 | Kang et al. | ................ 360/236.3 |
| 2002/0008938 A1 | 1/2002 | Nath et al. | |

(Continued)

*Primary Examiner* — Jefferson Evans (57) ABSTRACT

A head has an air bearing surface with left and right leading pressurizing steps. The left and right leading pressurizing steps are each partially surrounded by left and right leading pads, respectively. The left leading pressurizing step includes a left short region that extends for a first distance (measured parallel to the slider longitudinal axis) from the leading face of the slider to the left leading pad. The left leading pressurizing step also includes a left long region that extends for a second distance (measured parallel to the longitudinal axis) from the leading face to the left leading pad. The second distance is at least 25% greater than the first distance. The left short region is disposed closer to the left lateral face than is the left long region. The left long region is disposed closer to the longitudinal axis than is the left short region.

11 Claims, 5 Drawing Sheets

U.S. PATENT DOCUMENTS

| | | |
|---|---|---|
| 2002/0030938 A1 | 3/2002 | Boutaghou et al. |
| 2002/0041467 A1 | 4/2002 | Boutaghou et al. |
| 2002/0048120 A1 | 4/2002 | Boutaghou et al. |
| 2002/0051316 A1 | 5/2002 | Boutaghou |
| 2002/0071216 A1 | 6/2002 | Sannino et al. |
| 2002/0089789 A1 | 7/2002 | Baba et al. |
| 2002/0109941 A1 | 8/2002 | Chapin et al. |
| 2003/0058578 A1* | 3/2003 | Boutaghou et al. ........ 360/235.8 |
| 2003/0067719 A1 | 4/2003 | Boutaghou et al. |
| 2003/0128471 A1 | 7/2003 | Bolasna et al. |
| 2003/0227717 A1 | 12/2003 | Cha et al. |
| 2004/0027724 A1* | 2/2004 | Pendray et al. ............ 360/236.3 |
| 2004/0032694 A1 | 2/2004 | Sun et al. |
| 2004/0100732 A1 | 5/2004 | Deng et al. |
| 2004/0120075 A1 | 6/2004 | Rajakumar |
| 2004/0156143 A1 | 8/2004 | Kang |
| 2004/0240109 A1 | 12/2004 | Hamann et al. |
| 2005/0099728 A1 | 5/2005 | Deng et al. |
| 2005/0105216 A1 | 5/2005 | Ueno et al. |
| 2005/0190500 A1 | 9/2005 | Song |
| 2005/0213252 A1 | 9/2005 | Park |
| 2005/0225902 A1 | 10/2005 | Kohira |
| 2006/0023358 A1 | 2/2006 | Huang |
| 2006/0119986 A1 | 6/2006 | Takeuchi et al. |
| 2008/0024924 A1* | 1/2008 | Bolasna et al. ............ 360/236.2 |
| 2008/0123220 A1* | 5/2008 | Kajitani .................... 360/236.3 |

* cited by examiner

HEAD WITH AN AIR BEARING SURFACE HAVING LEFT AND RIGHT LEADING PRESSURIZING STEPS, EACH WITH SHORT AND LONG REGIONS

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

Figure 1:
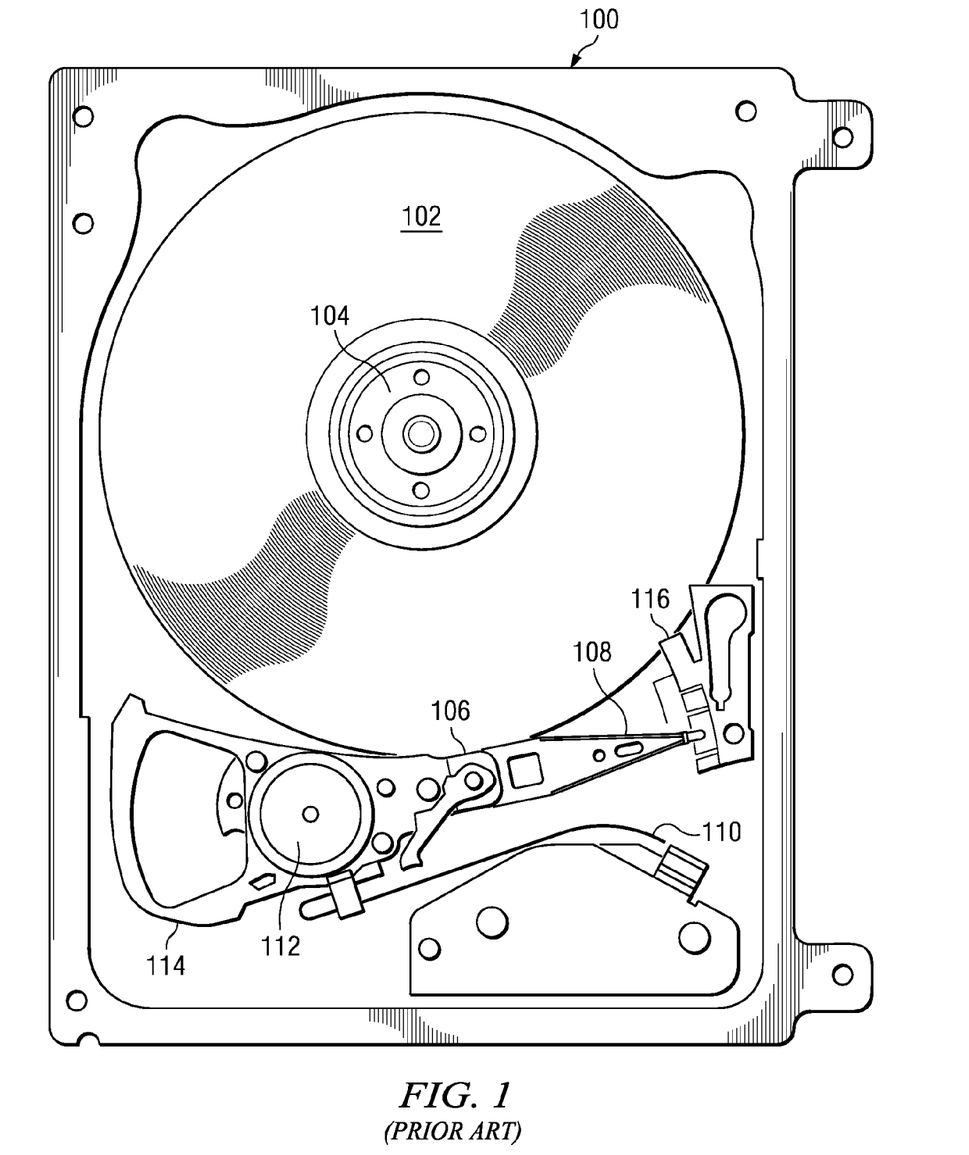
FIG. 1 depicts a contemporary hard disk drive information storage device.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. During operation of the magnetic hard disk drive 100, the transducer is typically supported in very close proximity to the magnetic disk 102 by a hydrodynamic air bearing. As the motor 104 rotates the magnetic disk 102, the hydrodynamic air bearing is formed between an air bearing surface of the slider of the head, and a surface of the magnetic disk 102. When the disk drive 100 is powered down, the HSA 106 rotates clockwise until a load tab of HGA 108 contacts a ramp 116 thereby lifting the slider from the surface of disk 102 before the disk 102 stops rotating. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable. Moreover, if the slider roll angle becomes excessive, then the air bearing may become even thinner at a corner of the slider than at the location of the transducer, potentially further degrading tribological performance.

One challenge that disk drive engineers face is to avoid an excessive roll angle of the slider despite changes in radial positioning of the head. As the radial position of the head changes, the relative direction of incoming air flow changes. Specifically, in disk drives that utilize a rotary actuator (or a linear actuator having a line of action that does not pass through the disk center) the skew of the slider will change as the actuator changes its radial position relative to the disk surface. As the skew of the slider changes, the direction of incoming air flow relative to the slider changes, tending to create a larger pressure beneath the leading portion of one of the slider's rails relative to the other. This can cause the roll angle of the slider to change excessively with radial position, perhaps leading to an unacceptable risk of slider corner contact with the disk at one or more radial positions. Frequent or severe slider corner contacts with the disk can adversely affect the tribology of the slider-disk interface, undesirably reducing the reliability of the information storage device. Accordingly, what is needed in the art is an air bearing design feature that reduces the sensitivity of the slider's roll angle to changes in slider skew.

SUMMARY

A novel head is disclosed and claimed. The head includes a transducer and a slider having a leading face, a trailing face opposite the leading face, a left lateral face, a right lateral face opposite the left lateral face, and an air bearing surface (ABS) adjacent the left lateral face, the right lateral face, the leading face, and the trailing face. The transducer is disposed on the trailing face. The ABS includes a trailing pad adjacent the transducer, defining a primary ABS plane. The primary ABS plane defines a longitudinal axis that lies in the primary ABS plane and is parallel to the left and right lateral faces, and that lies midway between the left and right lateral faces. The ABS also includes a sub-ambient pressure cavity being recessed from the primary plane by a cavity depth in the range 0.8 to 2 microns. The ABS also includes left and right leading pads each lying in the primary ABS plane. The left leading pad is disposed next to the left lateral face, and the right leading pad is disposed next to the right lateral face. The ABS also includes left and right leading pressurizing steps each being recessed from the primary plane by a pressurizing step depth in the range 0.05 to 0.5 microns. The left leading pressurizing step is partially surrounded by the left leading pad and is disposed between the left leading pad and the leading face. The right leading pressurizing step is partially surrounded by the right leading pad and is disposed between the right leading pad and the leading face. The left leading pressurizing step includes a left short region that extends for a first distance (measured parallel to the longitudinal axis) from the leading face to the left leading pad. The left leading pressurizing step also includes a left long region that extends for a second distance (measured parallel to the longitudinal axis) from the leading face to the left leading pad. The second distance is at least 25% greater than the first distance. The left short region is disposed closer to the left lateral face than is the left long region. The left long region is disposed closer to the longitudinal axis than is the left short region.

DETAILED DESCRIPTION OF EXEMPLARY EMBODIMENTS

Figure 2:
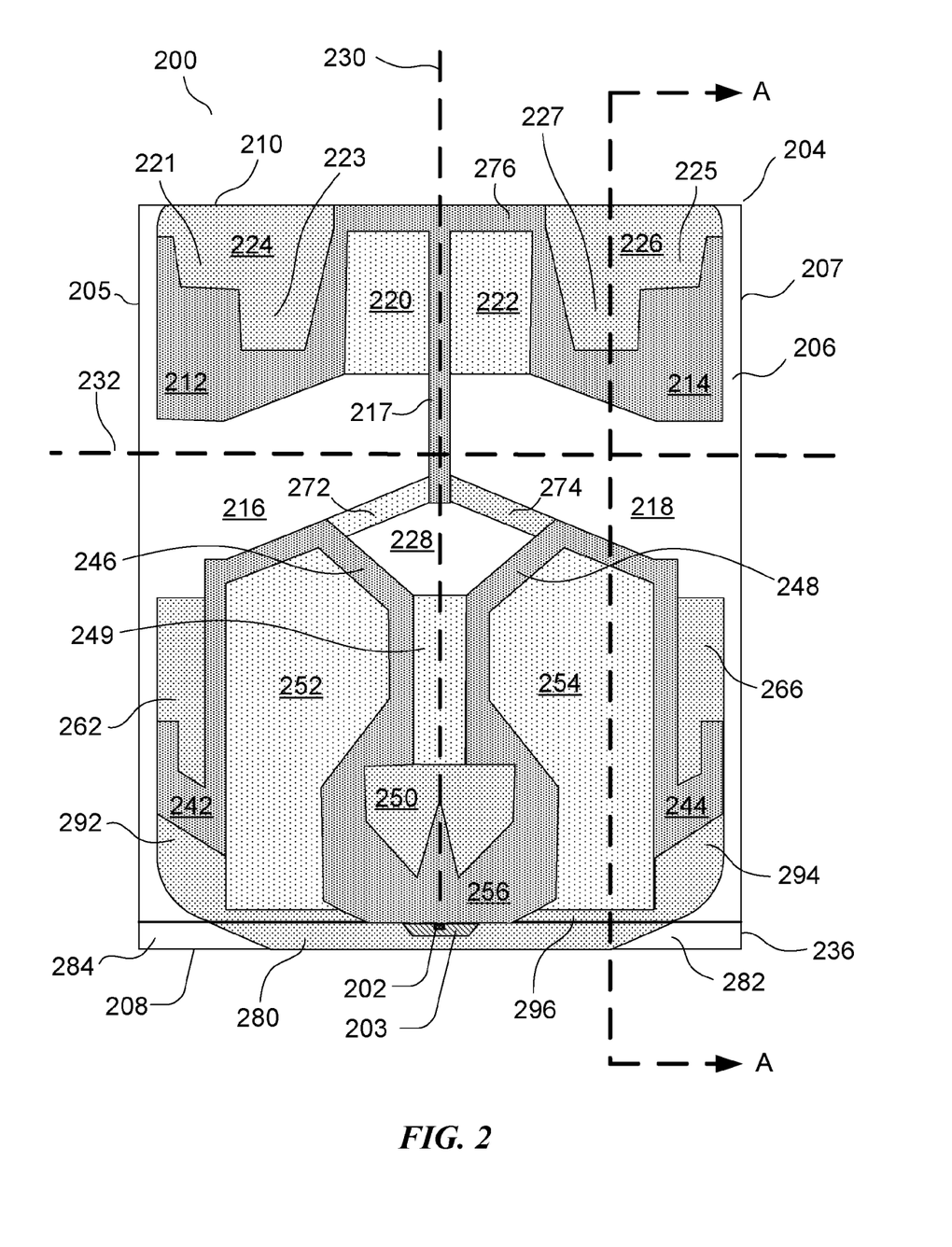
FIG. 2 is an air bearing surface view of a head according to an exemplary embodiment of the present invention (not necessarily to scale).

Now referring to FIG. 2, head 200 comprises a transducer 202 for at least reading information from the disk. In certain embodiments, the transducer 202 is a merged thin film magnetic transducer comprising an inductive writer and magneto resistive read element. In such embodiments, the magneto resistive element may be a giant magneto resistive element (GMR) or a tunneling magneto resistive element (TMR). In such embodiments, the writer may be a perpendicular magnetic recording (PMR) writer.

Head 200 also comprises a slider 204, which is typically fabricated from a ceramic material such as alumina titanium carbide. Slider 204 includes an air bearing surface 206, which may be formed on the surface of slider 204 by etching or ion milling and has a geometry that may be defined by use of a mask. The slider 204 has an overcoat layer 236 that includes a trailing face 208 and includes a transducer region 203 that overcoats the transducer 202. The slider 204 also includes a leading face 210.

Figure 3:
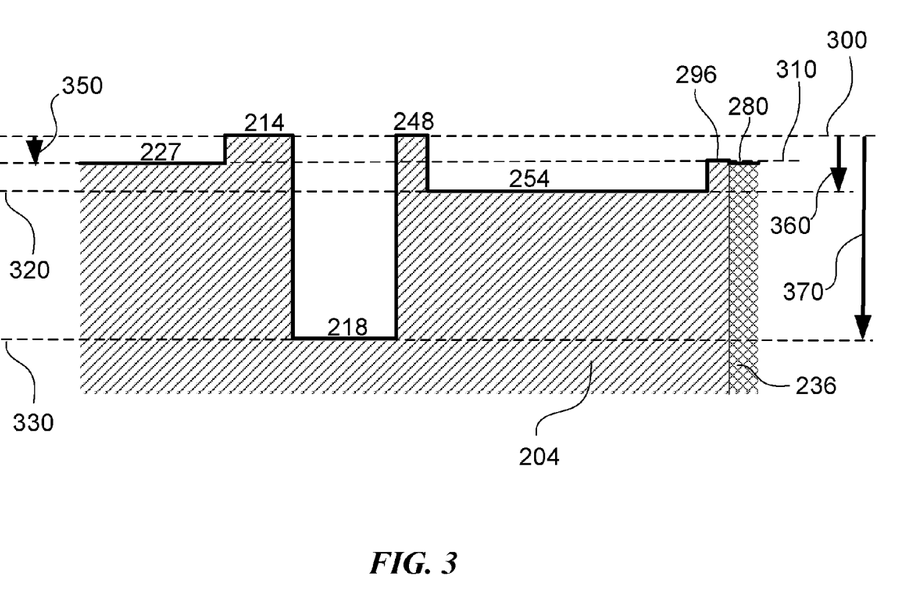
FIG. 3 is cross-sectional view of the head shown in FIG. 2, taken along the plane of cross-section designated as A-A in FIG. 2. For clarity, only the region of the cross-section near the air bearing surface is shown in FIG. 3 and the step heights are not to scale but rather are exaggerated so as to be easily discernible.

In the exemplary embodiment shown in FIG. 2 and FIG. 3, the air bearing surface 206 includes deep cavities 216 and 218, and shallow cavities 220 and 222. During operation, the shallow cavities 220 and 222 can develop a sub-ambient pressure region between the air bearing surface 206 and the surface of an adjacent disk. The sub-ambient pressure may serve to reduce flying height sensitivities to changes in altitude and air bearing geometries.

In the exemplary embodiment shown in FIG. 2 and FIG. 3, the air bearing surface 206 also includes a left leading pad 212 that is disposed next to the left lateral face 205 of the slider 204, and a right leading pad 214 that is disposed next to the right lateral face 207 of the slider 204. In the exemplary embodiment shown in FIG. 2 and FIG. 3, the left and right leading pads 212, 214 are also adjacent to and upstream of the deep cavities 216 and 218, respectively.

The term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing face 208 and towards the leading face 210. As such, in disk drive applications, upstream directions would ultimately be generally opposite the motion of an adjacent rotating disk surface. An upstream direction would be a direction within the aforementioned range. The term "downstream" is used herein as an antonym of "upstream."

The left and right leading pads 212, 214 may be separated by shallow cavities 220 and 222, respectively, and shallow cavities 220 and 222 may themselves be separated by a longitudinal divider 217.

In the embodiment of FIG. 2 and FIG. 3, the leading pads 212 and 214 each include a major surface that is not recessed and that, like trailing pad 256, establishes an air bearing surface datum plane (hereinafter referred to as the primary plane) 300, from which the recession of other surfaces that are approximately parallel to the primary plane 300 may be measured. During operation, the leading pads 212 and 214 can develop a super-ambient pressure region between the air bearing surface 206 and the surface of an adjacent disk, causing the slider to assume a positive pitch attitude. Deep cavities 216 and 218 each include a surface in a plane 330 that is recessed from the primary plane 300 by a deep cavity recession depth 370. The deep cavity recession depth is preferably but not necessarily in the range 3 microns to 4 microns. Shallow cavities 220 and 222 each include a surface in an intermediate plane 320 that lies between the primary plane 300 and the deep cavity plane 330, and that is recessed from the primary plane 300 by a shallow cavity recession depth 360. For example, the shallow cavity recession depth 360 is preferably in the range 0.8 microns to 2 microns.

In the exemplary embodiment of FIG. 2, the leading pads 212 and 214 are connected by a leading dam 276 that helps prevent particulate contamination from entering the air bearing, and that assists in creating sub-ambient pressure in shallow cavities 220 and 222.

In the exemplary embodiment shown in FIG. 2 and FIG. 3, the left and right leading pads 212 and 214 also include left and right leading pressurizing steps 224 and 226, respectively. The left and right leading pressurizing steps 224 and 226 each include a surface in a plane 310 that lies between the primary plane 300 and the intermediate plane 320. The plane 310 is recessed from the primary plane 300 by a pressurizing step recession depth 350. During operation, the left and right leading pressurizing steps 224 and 226 can help develop super-ambient pressure between the left and right leading pads 212 and 214, respectively, and the surface of an adjacent disk. The pressurizing step recession depth 350 is preferably in the range 0.05 microns to 0.5 microns. In certain embodiments, fabrication of the air bearing surface can be simplified if the deep cavity recession depth 370 is equal to the sum of the shallow cavity recession depth 360 and the pressurizing step recession depth 350.

The air bearing surface 206 defines a longitudinal axis 230 that lies in the primary plane 300, and that is parallel to the left lateral face 205 of the slider 204 and the right lateral face 207 of the slider 204, and that lies midway between the left lateral face 205 of the slider 204 and the right lateral face 207 of the slider 204. The total length of the slider 204 can be measured along longitudinal axis 230. A zero-skew upstream direction would be parallel to longitudinal axis 230.

The air bearing surface 206 also defines a lateral axis 232 that is orthogonal to the longitudinal axis 230. The total width of the slider 204 can be measured along lateral axis 232. In the embodiment of FIG. 2, each of the left and right leading pressurizing steps 224, 226 preferably laterally spans at least 10% of the total width of the slider 204, and the left and right leading pressurizing steps 224, 226 together preferably laterally span at least 30% of the total width of the slider 204.

In the embodiment of FIG. 2, the left leading pressurizing step 224 is partially surrounded by the left leading pad 212 and is disposed between the left leading pad 212 and the leading face 210. Likewise, the right leading pressurizing step 226 is partially surrounded by the right leading pad 214 and is disposed between the right leading pad 214 and the leading face 210.

In the embodiment of FIG. 2, the left leading pressurizing step 224 includes a left short region 221 that extends for a first distance measured parallel to the longitudinal axis 230 from the leading face 210 to the left leading pad 212, and includes a left long region 223 that extends for a second distance measured parallel to the longitudinal axis 230 from the leading face 210 to the left leading pad 212. The second distance is at least 25% greater than the first distance. The left short region 221 is disposed closer to the left lateral face 205 than is the left long region 223. The left long region 223 is disposed closer to the longitudinal axis 230 than is the left short region 221.

Likewise in the embodiment of FIG. 2, the right leading pressurizing step 226 includes a right short region 225 that extends for a first distance measured parallel to the longitudinal axis 230 from the leading face 210 to the right leading pad 214, and includes a right long region 227 that extends for a second distance measured parallel to the longitudinal axis 230 from the leading face 210 to the right leading pad 214. Again the second distance is at least 25% greater than the first distance. The right short region 225 is disposed closer to the right lateral face 207 than is the right long region 227. The right long region 227 is disposed closer to the longitudinal axis 230 than is the right short region 225.

In the embodiment of FIG. 2, each of the left and right short regions 221, 225 preferably laterally spans at least 2% of the total width of the slider 204, but no more than 15% of the total width of the slider 204. Also in the embodiment of FIG. 2, each of the left and right long regions 223, 225 preferably laterally spans at least 2% of the total width of the slider 204 but no more than 15% of the total width of the slider 204. In the embodiment of FIG. 2, each of the left and right long regions 223, 227 preferably longitudinally spans at least 13% of the total length of the slider 204, whereas each of the left and right short regions 221, 225 preferably longitudinally spans no more than 10% of the total length of the slider 204.

In certain embodiments, the disk drive can be designed so that the corner of leading pad 212 that lies between short region 221 of leading pressurizing step 224 and long region 223 of leading pressurizing step 224 is oriented to confront the skewed incoming air flow when the head is near the outer diameter of the disk. In those embodiments, the corner of leading pad 214 that lies between short region 225 of leading pressurizing step 226 and long region 227 of leading pressurizing step 226 is oriented to confront the skewed incoming air flow when the head is near the inner diameter of the disk. These corners may reduce the change in leading pad pressurization due to changes in slider skew, and thereby reduce the sensitivity of slider roll angle to changes in slider skew.

In the exemplary embodiment of FIG. 2, the air bearing surface 206 includes mid-cavity dams 272 and 274 that are disposed upstream of a central cavity 228. Mid-cavity dam 272 includes a surface in the plane 320, while mid-cavity dam 274 includes a surface in the plane 310.

In the exemplary embodiment of FIG. 2, the trailing pad 256 has a major surface adjacent the transducer 202, the major surface lying in (and defining, like leading pads 212 and 214) the primary plane 300. During operation, the trailing pad 256 can develop a super-ambient pressure region between the air bearing surface 206 and the surface of an adjacent disk that can help maintain a desired flying height at the location of transducer 202. For example, in the embodiment of FIG. 2, the trailing pad 256 creates a region of high pressure, including the highest pressure generated by the air bearing surface during normal operation of the head.

In the embodiment of FIG. 2, a pressurizing step surface 250 is disposed upstream of the trailing pad 256. The pressurizing step surface 250 includes a surface that lies in the plane 310. For example, the step surface may be recessed from the first surface 300 by the pressurizing step recession depth 350. During operation, the pressurizing step surface 250 can enhance the super-ambient pressure between the trailing pad 256 and the surface of an adjacent disk. Such enhanced pressurization may increase air bearing stiffness and/or may reduce the surface area required for the trailing pad 256. The embodiment shown in FIG. 2 also includes a shallow cavity region 249 immediately upstream of pressurizing step surface 250. Trailing pad side portions 246 and 248 can enhance the performance of the pressurizing step surface 250 by partially confining the airflow to pressurize the trailing pad 256.

In the embodiment of FIGS. 2 & 3, the overcoat layer 236 includes a trailing air flow dam 280 being recessed from the primary plane 300 by a step depth in the range 0.05 to 0.5 microns. The slider also includes a trailing air flow dam 296 adjacent the trailing air flow dam 280, recessed from the primary plane 300 by a step depth in the same range. Preferably the trailing air flow dam 280 is recessed from the primary plane 300 by an amount approximately equal to the pressurizing step recession depth 350, as shown in FIG. 3.

However, in certain embodiments the trailing air flow dam 280 is recessed from the primary plane 300 by an amount that is approximately equal to but marginally more than the pressurizing step recession depth 350, because of a difference in material etch rates. Specifically, the left and right leading pressurizing steps 224 and 226 are disposed over the main body of the slider 204, which typically comprises a ceramic wafer substrate material such as alumina titanium carbide, while the trailing air flow dam 280 comprises an overcoat material such as alumina. Alumina typically etches away more rapidly than does alumina titanium carbide during fabrication of the left and right leading pressurizing steps 224 and 226 and the trailing air flow dam 280. For example, because of the difference in etching rates, the trailing air flow dam 280 may be recessed up to 30% more than the pressurizing step recession depth 350.

In the embodiment of FIG. 2, the transducer region 203 is not etched; rather its surface lies close to the primary plane 300. In certain embodiments, the transducer region 203 is marginally recessed from the primary plane 300 due to lapping. For example, the transducer region 203 may be recessed from the primary plane 300 approximately 2.5 nanometers due to lapping. The transducer region 203 may also slightly protrude beyond the primary plane 300 due to thermal expansion (e.g. thermal pole tip protrusion and/or thermal dynamic transducer actuation).

In the embodiment of FIG. 2, the overcoat layer 236 also includes corner regions 282 and 284 recessed from the primary plane by at least the deep cavity recession depth 370. The corner regions 282 and 284 can be a desirable feature for avoiding rear corner contacts should the slider excessively roll relative to the disk surface during operation of the head and/or during a mechanical shock event.

In the embodiment of FIGS. 2 & 3, the air bearing surface 206 also includes two sub-ambient pressure cavities 252, 254 disposed adjacent to and upstream of the trailing air flow dam 280. The sub-ambient pressure cavities 252, 254 each include a surface in the plane 320 that is recessed from the primary plane 300 by the shallow cavity recession depth 360. Trailing pad side portions 246 and 248 may also extend around sub-ambient pressure cavities 252 and 254, to assist in the development of sub-ambient pressure within sub-ambient pressure cavities 252 and 254. During operation, the sub-ambient pressure cavities 252 and 254 may develop sub-ambient pressure in much the same way that shallow cavities 220 and 222 do, and thereby shift an effective center of net sub-ambient pressure rearward (towards the trailing face of the slider). Such a shift can facilitate separating the slider from the disk surface dynamically, during operation.

In the embodiment of FIGS. 2 & 3, the trailing air flow dams 280 and 296 may serve to reduce back flow from adjacent the trailing face 208 in the upstream direction 230 into the sub-ambient pressure cavities 252, 254, which, in turn, may serve to reduce the accumulation of lubricant and/or other debris in the sub-ambient pressure cavities 252, 254. The trailing air flow dam 280 is recessed from the primary plane 300 because, if it were not recessed, the air bearing designer could not allow the trailing air flow dam 280 to extend laterally sufficiently to adequately reduce back flow without potentially interfering with the disk surface given a non-zero roll angle. Specifically, during operation the air bearing 206 typically makes a non-zero roll angle with respect to the disk surface while it is desired that the location of minimum thickness of the air bearing be at or near the location of the transducer 202 (rather than on the trailing air flow dam 280).

In the embodiment of FIG. 2, the air bearing surface 206 also includes side pads 242 and 244. The side pads 242 and 244 each include a major surface that lies in the primary plane 300. Accordingly, the side pads 242 and 244 are located further upstream than the aft-most extent of the trailing pad 256. The side pad 242 includes side pressurizing step 262 and a side trailing step 292, each of which includes a surface in plane 310. The side pad 244 includes side pressurizing step 266 and a side trailing step 294, each of which includes a surface in plane 310.

Figure 4:
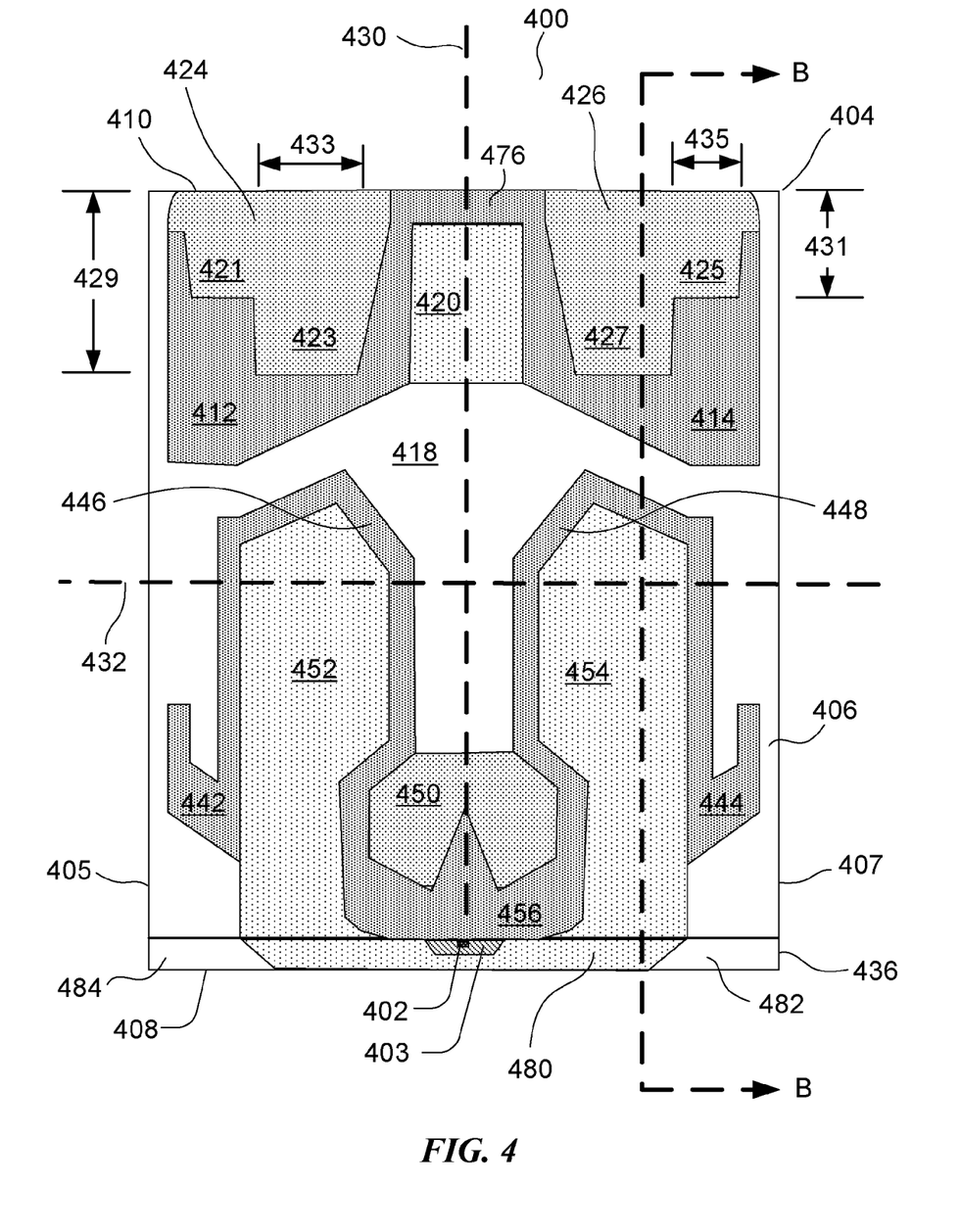
FIG. 4 is an air bearing surface view of a head according to another exemplary embodiment of the present invention (not necessarily to scale).

Now referring to FIG. 4, head 400 comprises a transducer 402 for at least reading information from the disk. Head 400 also comprises a slider 404, which is typically fabricated from a ceramic material such as alumina titanium carbide. Slider 404 includes an air bearing surface 406, which may be formed on the surface of slider 404 by etching or ion milling and has a geometry that may be defined by use of a mask. The slider 404 has an overcoat layer 436 that includes a trailing face 408 and includes a transducer region 403 that overcoats the transducer 402. The slider 404 also includes a leading face 410 opposing the trailing face 408.

Figure 5:
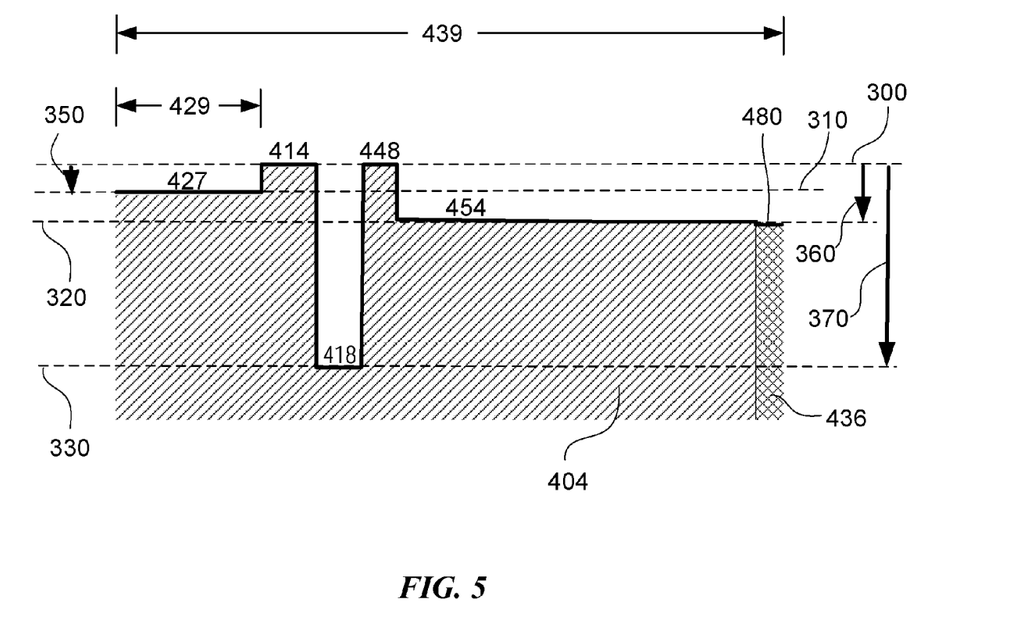
FIG. 5 is cross-sectional view of the head shown in FIG. 4, taken along the plane of cross-section designated as B-B in FIG. 4. For clarity, only the region of the cross-section near the air bearing surface is shown in FIG. 5 and the step heights are not to scale but rather are exaggerated so as to be easily discernible.

In the exemplary embodiment shown in FIG. 4 and FIG. 5, the air bearing surface 406 includes a deep cavity 418, and a shallow cavity 420 upstream of deep cavity 418. During operation, the shallow cavity 420 can develop a sub-ambient pressure region between the air bearing surface 406 and the surface of an adjacent disk. The sub-ambient pressure may serve to reduce flying height sensitivities to changes in altitude and air bearing geometries.

In the exemplary embodiment shown in FIG. 4 and FIG. 5, the air bearing surface 406 also includes a left leading pad 412 that is disposed next to the left lateral face 405 of the slider 404, and a right leading pad 414 that is disposed next to the right lateral face 407 of the slider 404. The left and right leading pads 412, 414 may be separated by shallow cavity 420.

In the embodiment of FIG. 4 and FIG. 5, the leading pads 412 and 414 each include a major surface that is not recessed and that, like trailing pad 456, establishes the primary plane 300 from which the recession of other surfaces that are approximately parallel to the primary plane 300 may be measured. During operation, the leading pads 412 and 414 can develop a super-ambient pressure region between the air bearing surface 406 and the surface of an adjacent disk, causing the slider to assume a positive pitch attitude. Deep cavity 418 includes a surface in the plane 330 that is recessed from the primary plane 300 by the deep cavity recession depth 370. Shallow cavity 420 includes a surface in the intermediate plane 320 that is recessed from the primary plane 300 by the shallow cavity recession depth 360.

In the exemplary embodiment of FIG. 4 the leading pads 412 and 414 are connected by a leading dam 476 that helps prevent particulate contamination from entering the air bearing, and that assists in creating sub-ambient pressure in shallow cavity 420.

In the exemplary embodiment shown in FIG. 4 and FIG. 5, the left and right leading pads 412 and 414 also include left and right leading pressurizing steps 424 and 426, respectively. The left and right leading pressurizing steps 424 and 426 each include a surface in the plane 310 that lies between the primary plane 300 and the intermediate plane 320. The plane 310 is recessed from the primary plane 300 by the pressurizing step recession depth 350. During operation, the left and right leading pressurizing steps 424 and 426 can help develop super-ambient pressure between the left and right leading pads 412 and 414, respectively, and the surface of an adjacent disk.

The air bearing surface 406 defines a longitudinal axis 430 that lies in the primary plane 300, and that is parallel to the left lateral face 405 of the slider 404 and the right lateral face 407 of the slider 404, and that lies midway between the left lateral face 405 of the slider 404 and the right lateral face 407 of the slider 404. The total length 439 of the slider 404 can be measured along longitudinal axis 430. A zero-skew upstream direction would be parallel to longitudinal axis 430.

The air bearing surface 406 also defines a lateral axis 432 that is orthogonal to the longitudinal axis 430. The total width of the slider 404 can be measured along lateral axis 432. In the embodiment of FIG. 4, each of the left and right leading pressurizing steps 424, 426 preferably laterally spans at least 10% of the total width of the slider 404, and the left and right leading pressurizing steps 424, 426 together preferably laterally span at least 30% of the total width of the slider 404.

In the embodiment of FIG. 4, the left leading pressurizing step 424 is partially surrounded by the left leading pad 412 and is disposed between the left leading pad 412 and the leading face 410. Likewise, the right leading pressurizing step 426 is partially surrounded by the right leading pad 414 and is disposed between the right leading pad 414 and the leading face 410.

In the embodiment of FIG. 4, the left leading pressurizing step 424 includes a left short region 421 that extends for a first distance measured parallel to the longitudinal axis 430 from the leading face 410 to the left leading pad 412, and includes a left long region 423 that extends for a second distance measured parallel to the longitudinal axis 430 from the leading face 410 to the left leading pad 412. The second distance is at least 25% greater than the first distance. The left short region 421 is disposed closer to the left lateral face 405 than is the left long region 423. The left long region 423 is disposed closer to the longitudinal axis 430 than is the left short region 421.

Likewise in the embodiment of FIG. 4, the right leading pressurizing step 426 includes a right short region 425 that extends for a first distance measured parallel to the longitudinal axis 430 from the leading face 410 to the right leading pad 414, and includes a right long region 427 that extends for a second distance measured parallel to the longitudinal axis 430 from the leading face 410 to the right leading pad 414. Again the second distance is at least 25% greater than the first distance. The right short region 425 is disposed closer to the right lateral face 407 than is the right long region 427. The right long region 427 is disposed closer to the longitudinal axis 430 than is the right short region 425.

In the embodiment of FIG. 4, each of the left and right short regions 421, 425 preferably laterally spans a distance 435 that is at least 2% of the total width of the slider 404, but no more than 15% of the total width of the slider 404. Also in the embodiment of FIG. 4, each of the left and right long regions 423, 427 preferably laterally spans a distance 433 that is at least 2% of the total width of the slider 404 but no more than 15% of the total width of the slider 404. In the embodiment of FIG. 4, each of the left and right long regions 423, 427 preferably longitudinally spans a distance 429 that is at least 13% of the total length 439 of the slider 404, whereas each of the left and right short regions 421, 425 preferably longitudinally spans a distance 431 that is no more than 10% of the total length 439 of the slider 404.

In certain embodiments, the disk drive can be designed so that the corner of leading pad 412 that lies between short region 421 of leading pressurizing step 424 and long region 423 of leading pressurizing step 424 is oriented to confront the skewed incoming air flow when the head is near the outer diameter of the disk. In those embodiments, the corner of leading pad 414 that lies between short region 425 of leading pressurizing step 426 and long region 427 of leading pressurizing step 426 is oriented to confront the skewed incoming air flow when the head is near the inner diameter of the disk. These corners may reduce the change in leading pad pressurization due to changes in slider skew, and thereby reduce the sensitivity of slider roll angle to changes in slider skew.

In the exemplary embodiment of FIG. 4, the trailing pad 456 has a major surface adjacent the transducer 402, the major surface lying in (and defining, like leading pads 412 and 414) the primary plane 300. During operation, the trailing pad 456 can develop a super-ambient pressure region between the air bearing surface 406 and the surface of an adjacent disk that can help maintain a desired flying height at the location of transducer 402. For example, in the embodiment of FIG. 4, the trailing pad 456 creates a region of high pressure, including the highest pressure generated by the air bearing surface during normal operation of the head.

In the embodiment of FIG. 4, a pressurizing step surface 450 is disposed upstream of the trailing pad 456. The pressurizing step surface 450 includes a surface that lies in the plane 310. During operation, the pressurizing step surface 450 can enhance the super-ambient pressure between the trailing pad 456 and the surface of an adjacent disk. Such enhanced pressurization may increase air bearing stiffness and/or may reduce the surface area required for the trailing pad 456. Trailing pad side portions 446 and 448 can enhance the performance of the pressurizing step surface 450 by partially confining the airflow to pressurize the trailing pad 456.

In the embodiment of FIG. 4, the transducer region 403 is not etched; rather its surface lies close to the primary plane 300. In certain embodiments, the transducer region 403 is marginally recessed from the primary plane 300 due to lapping. The transducer region 403 may also slightly protrude beyond the primary plane 300 due to thermal expansion (e.g. thermal pole tip protrusion and/or thermal dynamic transducer actuation).

In the embodiment of FIG. 4, the overcoat layer 436 includes a center region 480 that is recessed from the primary plane 300 by approximately the shallow cavity recession depth 360. The overcoat layer 436 also includes corner regions 482 and 484 that are recessed from the primary plane by at least the deep cavity recession depth 370. The corner regions 482 and 484 can be a desirable feature for avoiding rear corner contacts should the slider excessively roll relative to the disk surface during operation of the head and/or during a mechanical shock event.

In the embodiment of FIG. 4 and FIG. 5, the air bearing surface 406 also includes two sub-ambient pressure cavities 452, 454. The sub-ambient pressure cavities 452, 454 each include a surface in the plane 320 that is recessed from the primary plane 300 by the shallow cavity recession depth 360. Trailing pad side portions 446 and 448 may also extend around sub-ambient pressure cavities 452 and 454, to assist in the development of sub-ambient pressure within sub-ambient pressure cavities 452 and 454. During operation, the sub-ambient pressure cavities 452 and 454 may develop sub-ambient pressure in much the same way that shallow cavity 420 does, and thereby shift an effective center of net sub-ambient pressure rearward (towards the trailing face of the slider). Such a shift can facilitate separating the slider from the disk surface dynamically, during operation.

In the embodiment of FIG. 4, the air bearing surface 406 also includes side pads 442 and 444. The side pads 442 and 444 each include a major surface that lies in the primary plane 300. Accordingly, the side pads 442 and 444 are located further upstream than the aft-most extent of the trailing pad 456.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
a slider having a leading face, a trailing face opposite the leading face, a left lateral face, a right lateral face opposite the left lateral face, and an air bearing surface (ABS) adjacent the left lateral face, the right lateral face; the leading face, and the trailing face; and
a transducer disposed on the trailing face;
wherein the ABS includes:
- a trailing pad adjacent the transducer and defining a primary ABS plane, the primary ABS plane defining a longitudinal axis that lies in the primary ABS plane and that is parallel to the left and right lateral faces and that lies midway between the left and right lateral faces;
- a sub-ambient pressure cavity being recessed from the primary plane by a cavity depth in the range 0.8 to 2 microns;
- left and right leading pads each lying in the primary ABS plane, the left leading pad being disposed next to the left lateral face, and the right leading pad being disposed next to the right lateral face;
- left and right leading pressurizing steps each being recessed from the primary plane by a pressurizing step depth in the range 0.05 to 0.5 microns, the left leading pressurizing step being partially surrounded by the left leading pad and being disposed between the left leading pad and the leading face; and the right leading pressurizing step being partially surrounded by the right leading pad and being disposed between the right leading pad and the leading face;
- wherein the left leading pressurizing step includes a left short region that extends for a first distance measured parallel to the longitudinal axis from the leading face to the left leading pad, and includes a left long region that extends for a second distance measured parallel to the longitudinal axis from the leading face to the left leading pad; and
- wherein the left short region is disposed closer to the left lateral face than is the left long region, wherein the left long region is disposed closer to the longitudinal axis than is the left short region, and wherein the second distance is at least 25% greater than the first distance.

2. The head of claim 1 wherein the right leading pressurizing step includes a right short region that extends for the first distance measured parallel to the longitudinal axis from the leading face to the right leading pad, and includes a right long region that extends for the second distance measured parallel to the longitudinal axis from the leading face to the right leading pad, wherein the right short region is disposed closer to the right lateral face than is the right long region, and wherein the right long region is disposed closer to the longitudinal axis than is the right short region.

3. The head of claim 1 wherein left and right leading pads are connected by a leading dam that lies in the primary ABS plane.

4. The head of claim 1 wherein the air bearing surface further defines a lateral axis that lies in the primary ABS plane and is orthogonal to the longitudinal axis, the slider having a total width measured along the lateral axis, and wherein each of the left and right leading pressurizing steps laterally spans at least 10% of the total width.

5. The head of claim 4 wherein the left and right leading pressurizing steps together laterally span at least 30% of the total width.

6. The head of claim 4 wherein each of the left and right short regions laterally spans at least 2% of the total width but no more than 15% of the total width.

7. The head of claim 4 wherein each of the left and right long regions laterally spans at least 2% of the total width but no more than 15% of the total width.

8. The head of claim 1 wherein the air bearing surface further comprises a deep cavity, the deep cavity being recessed from the primary plane by 2 to 4 microns.

9. The head of claim 1 wherein the slider has a total length measured along the longitudinal axis, and wherein each of the left and right long regions longitudinally spans at least 13% of the total length.

10. The head of claim 9 wherein each of the left and right short regions longitudinally spans no more than 10% of the total length.

11. The head of claim 1 wherein the transducer is a merged magnetic transducer that includes a read element and a writer.

* * * * *